United States Patent
Taylor, Jr.

(10) Patent No.: US 6,535,624 B1
(45) Date of Patent: Mar. 18, 2003

(54) GEL ELECTROPHORESIS IMAGE COMBINING FOR IMPROVED DYNAMIC RANGE

(75) Inventor: John Taylor, Jr., Clayton, NC (US)

(73) Assignee: Large Scale Proteomics Corporation, Germantown, MD (US)

( * ) Notice: Subject to any disclaimer, the term of this patent is extended or adjusted under 35 U.S.C. 154(b) by 0 days.

(21) Appl. No.: 09/387,728

(22) Filed: Sep. 1, 1999

(51) Int. Cl.$^7$ .................................................. G06K 9/00
(52) U.S. Cl. ....................................................... 382/128
(58) Field of Search ......................... 382/128; 128/922; 250/455; 356/39; 435/6

(56) References Cited

U.S. PATENT DOCUMENTS

| | | | |
|---|---|---|---|
| 4,592,089 A | * 5/1986 | Hartman | 348/135 |
| 4,709,212 A | 11/1987 | MacFall et al. | |
| 4,909,920 A | 3/1990 | Sarrine et al. | |
| 5,275,710 A | 1/1994 | Gombocz et al. | |
| 5,420,628 A | 5/1995 | Poulsen et al. | 348/135 |
| 5,470,710 A | * 11/1995 | Weiss et al. | 435/6 |
| 5,571,643 A | 11/1996 | Martin et al. | 430/30 |
| 5,795,716 A | 8/1998 | Chee et al. | 435/6 |
| 6,351,547 B1 | * 2/2002 | Johnson et al. | 382/128 |

FOREIGN PATENT DOCUMENTS

WO    WO 96/41567 A2    12/1996

OTHER PUBLICATIONS

P. Fischer et al., "Optimal Addition of Images for Detection and Photometry," The Astronomical Journal 107(2):802–810, Feb. 1994.

* cited by examiner

*Primary Examiner*—Timothy M. Johnson
(74) *Attorney, Agent, or Firm*—Rothwell, Figg, Ernst & Manbeck, p.c.

(57) ABSTRACT

A computer-implemented image processing method and apparatus for combining a plurality of gel electrophoresis images. The method includes the steps of fitting the gel electrophoresis pixel intensity values for a subject pixel to a mathematical function, computing from the mathematical function a pixel intensity value according to a predetermined rule, and inserting the pixel intensity value into the composite image. The apparatus includes an image capturing device, and a computer having a memory and communicating with the image capturing device, the computer capable of receiving and storing into the memory a plurality of gel electrophoresis images from the image capturing device, the computer being further capable of fitting a plurality of intensity values of a pixel to a mathematical function over time and computing an optimal pixel intensity value for use in the composite image.

12 Claims, 9 Drawing Sheets

GEL ELECTROPHORESIS IMAGE COMBINING FOR IMPROVED DYNAMIC RANGE

BACKGROUND OF THE INVENTION

1. Field of the Invention

The present invention relates generally to a computer-implemented image processing method, and more particularly to a computer-implemented image processing method for increasing a dynamic range of a gel electrophoresis image by combining a plurality of gel electrophoresis images into one composite gel electrophoresis image.

2. Description of the Background Art

Image processing is a method of manipulating an image or image data in order to enhance desired features or to diminish undesirable features. Image processing may enhance the usefulness of an image by changing the intensity, contrast, borders, size, placement, etc. of an image.

An image processing algorithm may be reduced to a set of steps that may be automatically and rapidly applied to an image, therefore dramatically streamlining image processing. This is of great importance in applications where large amounts of raw data must be reduced to meaningful results. Computers and digital electronics have brought about a multitude of ways in which images may be processed and manipulated. Numerous mathematical algorithms may be used, and image data may be processed on the level of individual pixels (in computer terms, a pixel is a basic picture element and is the smallest unit of visual information in an image).

One area in which computer-implemented image processing is useful is in the area of macromolecular analysis. Modern medicine has made great advances through the study of body chemistry and cell components. Living tissue is made up of a vast array of macromolecules, or large molecules, which perform a vast array of functions. Macromolecules, their identity, placement, and function, are important for many reasons, including, for example, drug actions and interactions, drug concentrations, body chemistry, DNA and RNA analysis, protein detection, protein generation, etc. Macromolecular analysis is particularly useful in stained gel applications, and may encompass applications such as, for example, protein analysis, DNA analysis, RNA analysis, etc. Large scale automation and computer processing are needed because of the huge numbers of component combinations that must be identified.

A macromolecular analysis has several general steps. First, a test sample is prepared, containing a test material to be analyzed. The prepared test sample is then electrophoresed to physically separate components of the test sample. Electrophoresis is a process wherein macromolecules suspended in a liquid or gel are subjected to an electrical field, physically separating particles on the basis of inherent electrical charges and/or size. The electrophoresis separation may be performed in one or more dimensions. A two-dimensional electrophoresis process creates a two-dimensional distribution of components throughout the electrophoresis gel. The electrophoresis is generally followed by a staining step wherein a stain is bonded to a certain type of molecule contained in the macromolecules of the test material. Typical stains include visible and fluorescent stains. In a two-dimensional electrophoresis gel this creates a two-dimensional pattern of components (spots).

As a step in the macromolecular analysis process, an image may be captured in preparation for the spot or pattern analysis. The pattern may then be analyzed to determine the macromolecular components, such as proteins, nucleic acids, polysaccharides, etc. Patterns may be analyzed in a variety of ways, including a comparison to a known pattern or set of components. The analysis of images or patterns as a step in macromolecule analysis requires that the images or patterns be well developed and complete in order that a final determination be reliable.

The relative positions or patterns of the spots can be used to determine the macromolecular components. The pattern analysis step is critical, because even if the process is carefully controlled up to this point, an incorrect pattern analysis may yield incorrect, confusing, or misleading results. This is because the size, physical location, and intensity of electrophoresed spots can be used to determine the macromolecular components of a sample under test.

Image development and analysis has typically worked with a single image, and spots or patterns of spots from this single image are analyzed. However, there is a drawback in using only a single image because it is difficult if not impossible to measure accurately intensities of both faint and intense spots from the same image. The ratio of the most measurable intense spot to the least intense measurable spot is called the dynamic range. A process that drops faint objects or that allows a dark or heavy object to obscure other objects is said to have a poor dynamic range.

There are three cases that need to be considered:

1. In macromolecular analysis methods where a carrier, such as a gel slab, is immersed in a developer or stain, individual spots may become visible at different rates, so that over a time span spots and patterns of spots may appear, darken, and ultimately reach saturation. There is no single point in time that yields optimal visualization for all objects in the image simultaneously. Taking multiple scans during development is required in order to maximize the information about both faint and intense objects.

2. For autoradiographic methods the sample is first tagged with radioisotopes. The carrier (gel slab) is placed against a) a photographic film, or b) a phosphorimaging plate for a period of time until the desired exposure is reached. For a), the film is developed and scanned to produce a digital image. For b) the plate is scanned in a specially designed laser scanner which also yields a digital image. For both cases the dynamic range is determined by the selected exposure time. There may be no exposure time value that is optimal for quantifying all objects in the image simultaneously. Multiple scans taken for different exposure times are required to capture information for both faint and intense objects.

3. For fluorescently-stained gels the gel is typically scanned using a CCD or other type of camera (suitably filtered to accept light at the emission wavelengths) while illuminating the gel with a light source operating at the proper excitation wavelengths. The dynamic range will be influenced by the combination of illumination and exposure settings. Again there may be no single combination of settings that is optimal for quantifying all objects in the image simultaneously. Faint objects will not be visible at short exposures and intense objects will be saturated at the longer exposures. Multiple scans with different exposure and/or illumination settings are required in order to maximize the obtainable information.

For all three cases above, multiple images are required in order to maximize the dynamic range and obtain quantitative information about both faint and intense objects. The analysis can take two forms:
1. Analyze each image separately and combine the results.
2. Combine the images and analyze the resultant combination image.

This invention addresses the latter case. That is, multiple images are combined to form a single image with greatly enhanced dynamic range, and that single image is used for both analysis and inspection.

SUMMARY OF THE INVENTION

A computer-implemented image processing method for increasing a dynamic range of a gel electrophoresis image by combining a plurality of gel electrophoresis images into one composite gel electrophoresis image is provided according to a first aspect of the invention. The computer-implemented image processing method comprises the steps of fitting gel electrophoresis pixel intensity values for a subject pixel to a mathematical function, computing from the mathematical function a pixel intensity value according to a predetermined rule, and inserting this pixel intensity value into the composite image.

A computer-implemented image improvement apparatus for increasing a dynamic range of a gel electrophoresis image by combining a plurality of gel electrophoresis images into one composite gel electrophoresis image is provided according to a second aspect of the invention. The computer-implemented image improvement apparatus comprises an image capturing device, and a computer having a memory and communicating with the image capturing device, the computer capable of receiving and storing into the memory a plurality of gel electrophoresis images from the image capturing device, the computer being further capable of fitting a plurality of intensity values of a pixel to a mathematical function over time and computing an optimal pixel intensity value for use in the composite image.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Macromolecular analysis is commonly performed by means of a gel electrophoresis process. Electrophoresis is a process wherein macromolecules suspended in a liquid or gel are subjected to an electrical field, physically separating the macromolecules on the basis of inherent electrical charges and/or size. As a result of a first electrophoresis process, macromolecular components of the sample are physically separated in one dimension. This electrophoresed sample may be subjected to a second electrophoresis process, wherein the macromolecular components are physically separated in a second dimension. This process is termed two-dimensional gel electrophoresis and it produces a gel wherein the macromolecular components are distributed in two dimensions. When electrophoresis is complete, be it in one, two, or more dimensions, the gel may be treated with a stain. The purpose of the stain is to attach to target components, such as proteins, for example, so that the components become visible for the purpose of analysis. The spots can be then analyzed to determine the presence, absence, and amount of macromolecular components.

More detail on automated electrophoresis and staining can be found in pending application to Anderson, et al., WO 98/59092, incorporated herein by reference.

Different stains may be used in the staining process according to the desired results and the properties of individual stains. Silver stain is a type of stain that is commonly used for electrophoresis of proteins. Silver stain produces an excellent contrast between a stain spot and the background. The image of protein spots produced by the silver staining process takes time to develop, and the resulting spots may develop at different rates and may appear at different times. The density (darkness) of a spot may reflect a no concentration of the particular target component, but spot intensity may be limited by the amount of stain reagents available locally or other factors. Therefore, individual spots within a gel may need to be captured or imaged at different times in order to obtain an optimum spot development. By deriving an optimal spot intensity from the plurality of images taken over time, the present invention may assemble a composite image that gives optimal dynamic range.

The optimal spot development can be determined by capturing and examining a plurality of images of the gel over time. A plurality of images may also be obtained where the gel (or photographic film, etc.) must be repeatedly or continuously exposed as part of the process, or wherein multiple samples are being imaged and compared.

Each spot in a gel electrophoresis image may be composed of one or more pixels. As part of the image processing procedure, images may be digitally captured and stored for analysis. Each pixel, or individual image element, has an associated intensity value. The intensity value represents the darkness of the image, and gives the pixel the capability to range from white to black.

Figure 1A:
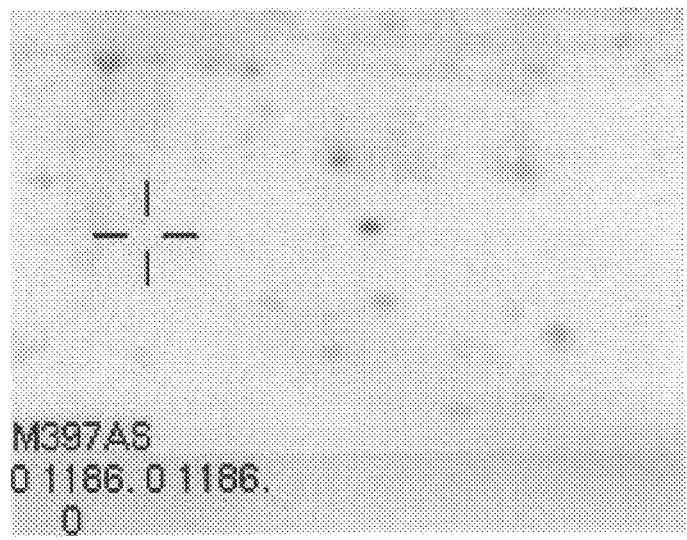
FIGS. 1A–1D show a series of gel electrophoresis images taken over time during development in a silver staining process.
Figure 1B:
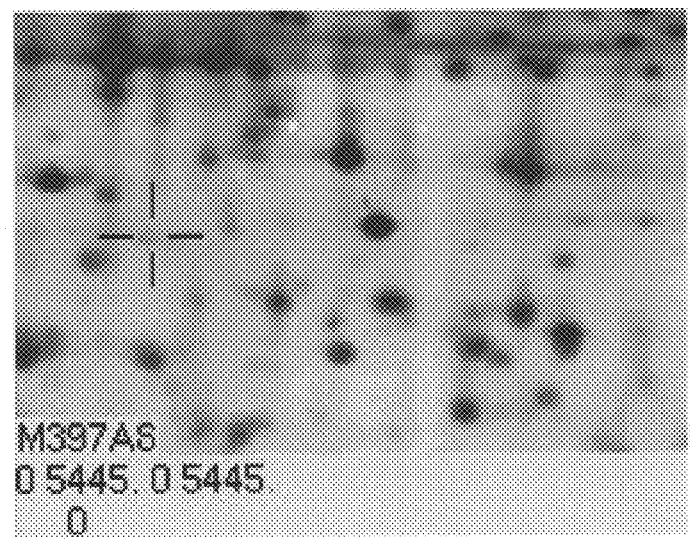
Figure 1C:
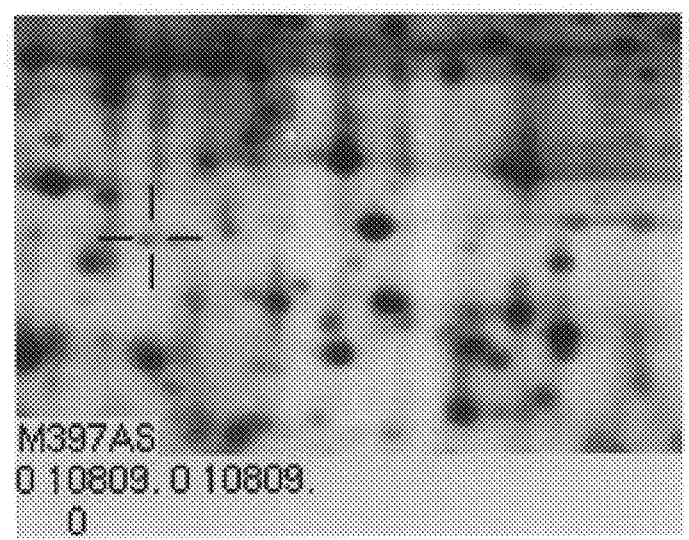
Figure 1D:
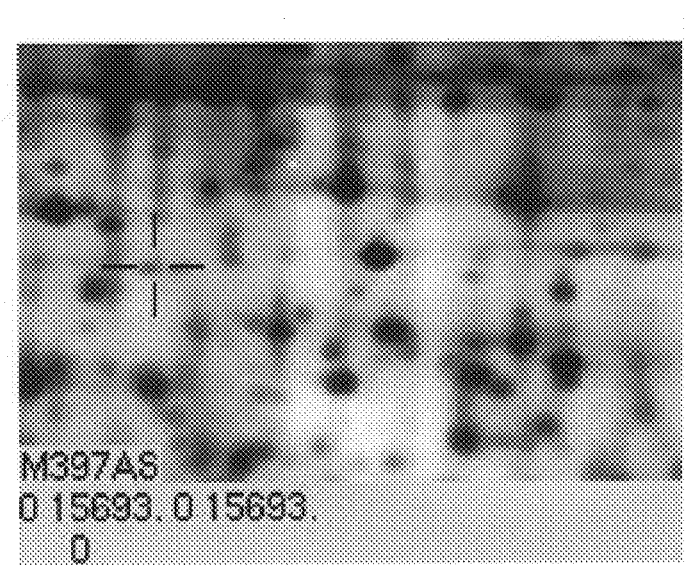

FIGS. 1A–1D show a series of gel electrophoresis images of a first sample taken over time, illustrating the need for the present invention. Very faint spots are beginning to appear in FIG. 1A as the stain develops, revealing the macromolecular components. In FIG. 1B the spots have darkened, and more spots have appeared. In FIG. 1C, a spot has begun to appear in the cross-hairs (the cross-hairs are centered on one developing spot throughout images 1A–1D). In FIG. 1D the spot is still rather faint.

Figure 1E:
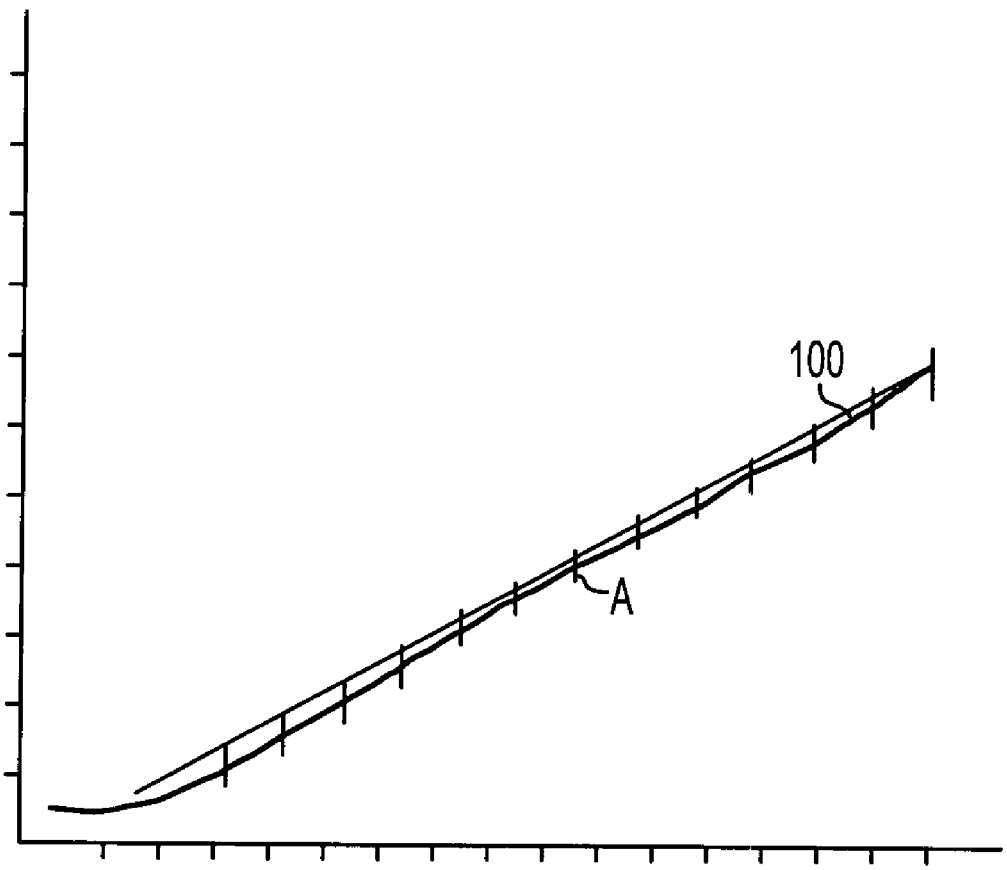
FIG. 1E shows a graph of image intensity versus time for a subject spot developed in FIGS. 1A–1D.
Figure 2A:
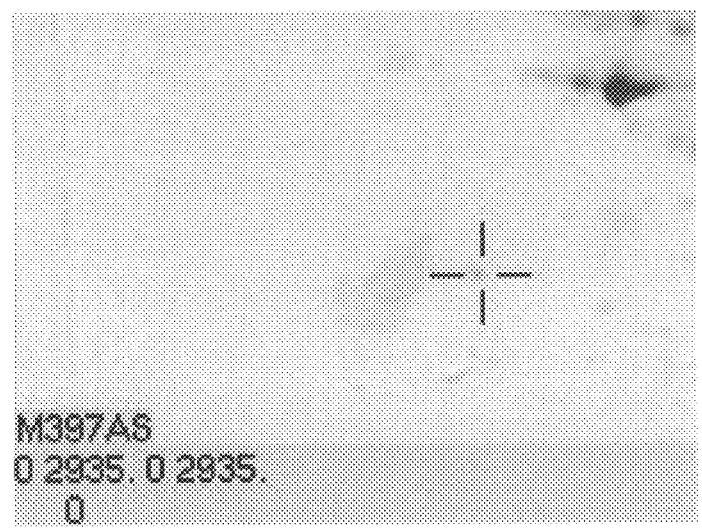
FIGS. 2A–2D show a second series of gel electrophoresis images taken over time, illustrating a saturated spot.
Figure 2B:
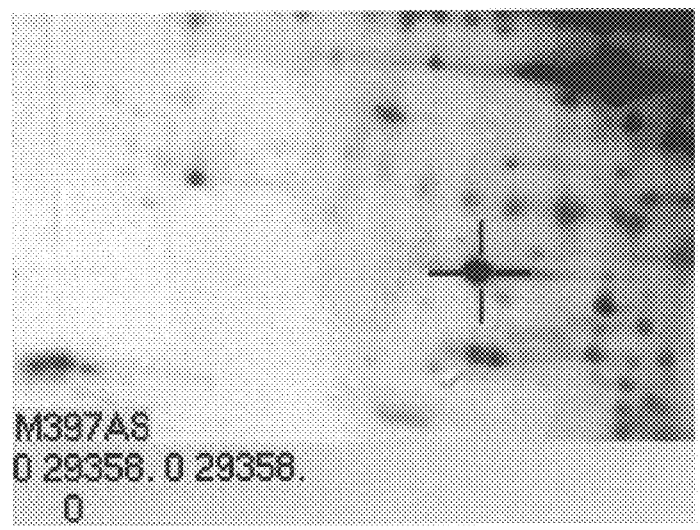
Figure 2C:
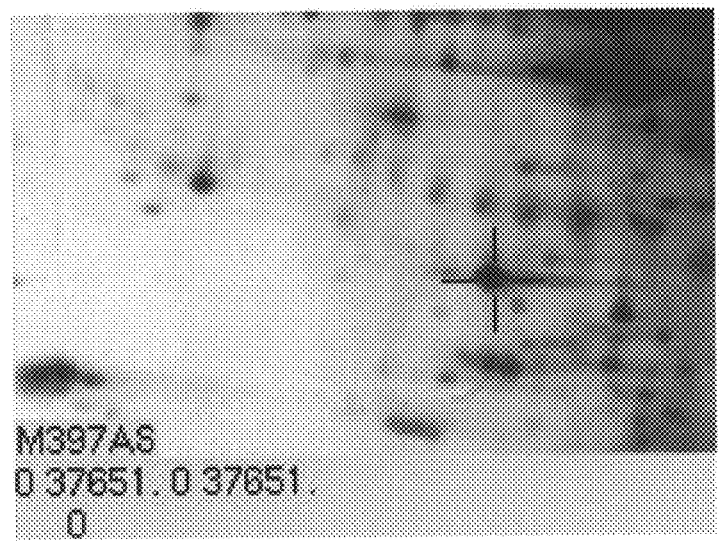
Figure 2D:
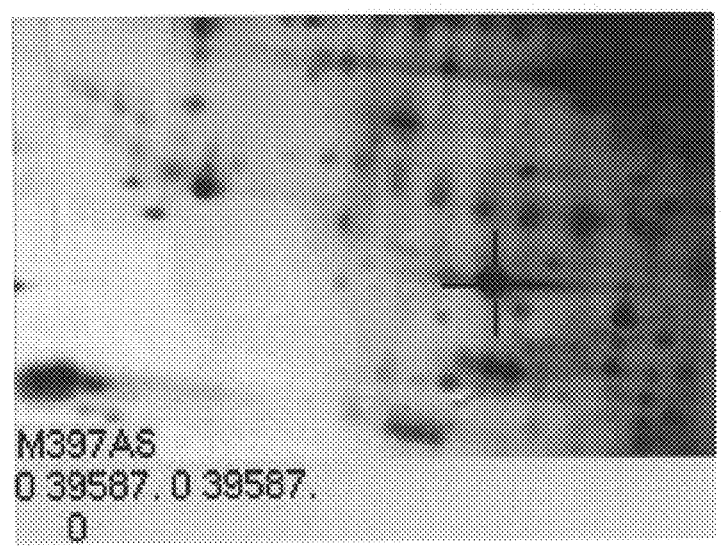

FIG. 1E is a graph of the intensity values of the spot in the cross-hairs, showing the relative absorption of stain by the spot over time. The vertical axis represents the intensity value of the subject spot, with the digital values representing gray scale pixel values. The horizontal axis represents time. It can be seen from the graph that the subject spot is exhibiting an essentially linear response, indicating that the spot will most likely continue to darken if development is continued. The line 100 has the same slope as the maximum slope observed from the graph itself. FIGS. 2A–2D show a series of gel electrophoresis images of another spot taken over time. In FIG. 2A, only two spots have started to develop in the upper right-hand corner of the image. In FIG. 2B a spot has developed under the cross-hairs (the cross-hairs are centered on one developing spot throughout images 2A–2D). In FIG. 2C the subject spot appears to have reached or nearly reached a maximum no intensity value. In FIG. 2D the spot has become saturated. Saturated spots present a serious problem when only a single image is being analyzed because it is difficult to estimate the a intensity value that would have been measured had the pixel not been saturated.

Figure 2E:
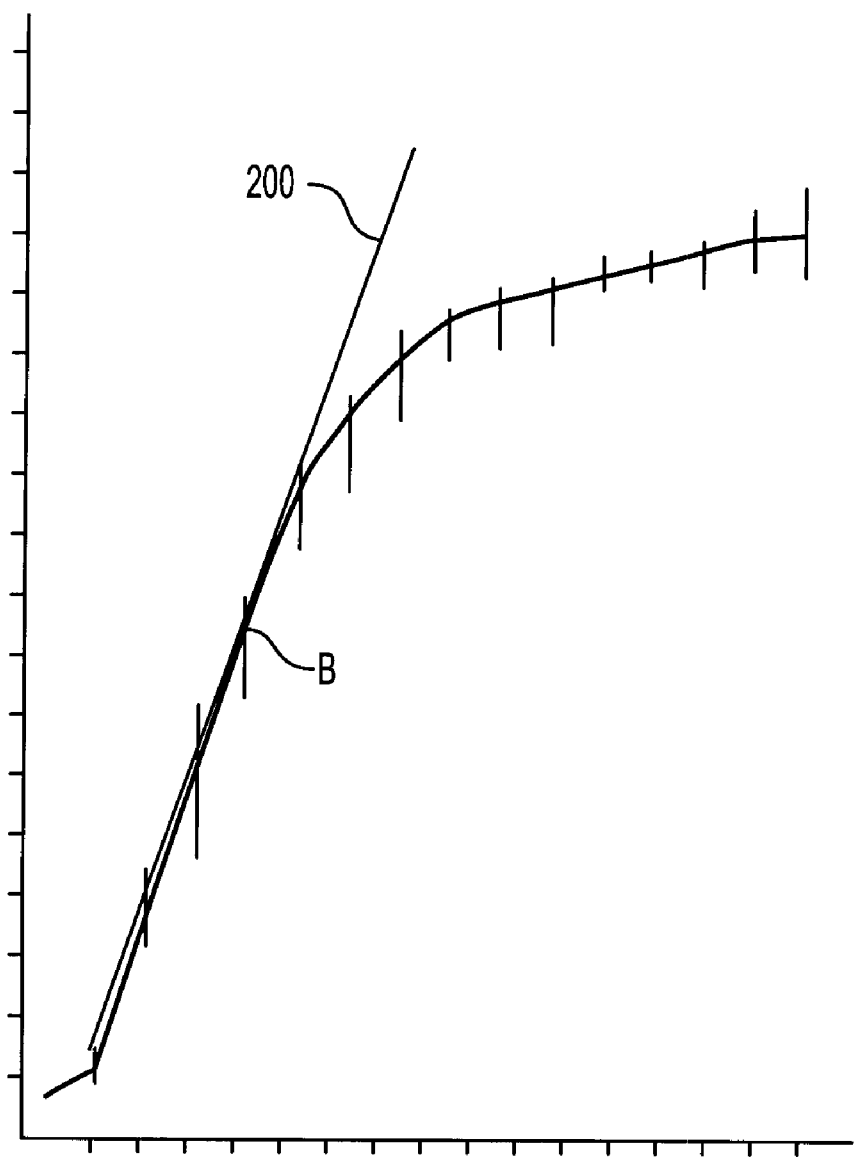
FIG. 2E shows a graph of image intensity versus time for a saturated subject spot developed in FIGS. 2A–2D.

FIG. 2E is a graph of the intensity values of the pixel in the cross-hairs, showing the relative development of stain over time. It can be seen from the graph that the pixel intensity values are leveling off over time. The intensity in some cases may reach a peak and actually start to decrease. It should be apparent from FIG. 2E that these curves may be used to determine an optimal value for each pixel in the composite image. The line 200 has the same slope as the maximum slope observed from the graph itself. An optimal spot intensity value based on the maximum slope may therefore be put into a composite image having spots developing at different rates.

Figure 3:
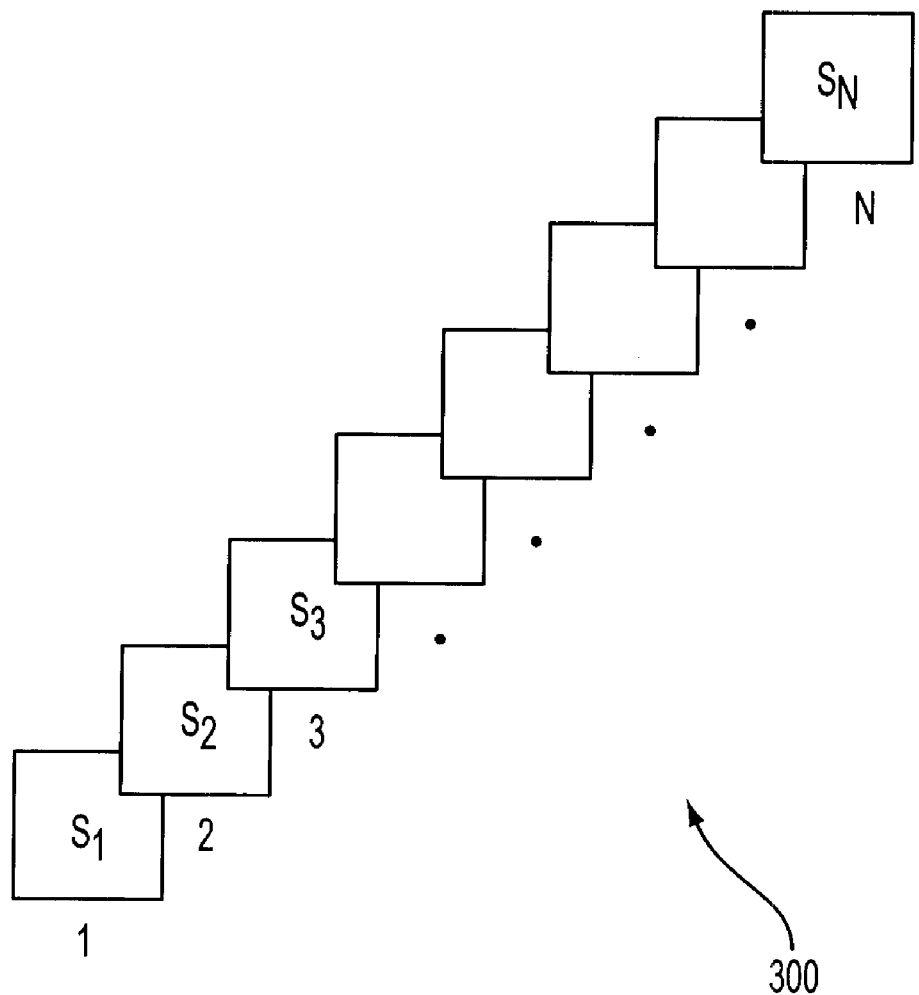
FIG. 3 shows a preferred memory embodiment for storing the spot intensity values of a gel electrophoresis image.

FIG. 3 shows a preferred memory embodiment for storing the pixel intensity values of a gel electrophoresis image. An image is preferably stored as a three-dimensional array A(X,Y,T), where X and Y are pixel coordinates in the image and T is an index of the time points at which the images were acquired. The time points do not have to be evenly spaced (i.e., the images may be taken at irregular times). FIG. 3 shows a time segment of such an array, with cells 1-N taken over a time period. The values within the cells represent an image intensity of the pixel given by the particular X and Y coordinates. The values within each cell may vary depending on the desired resolution of the image. For an 8 bit resolution, 0–255 image intensity levels exist, allowing 255 shades of gray to be shown. For greater resolution, a 16 bit value may be used, giving approximately 65 thousand image intensity levels.

Figure 4:
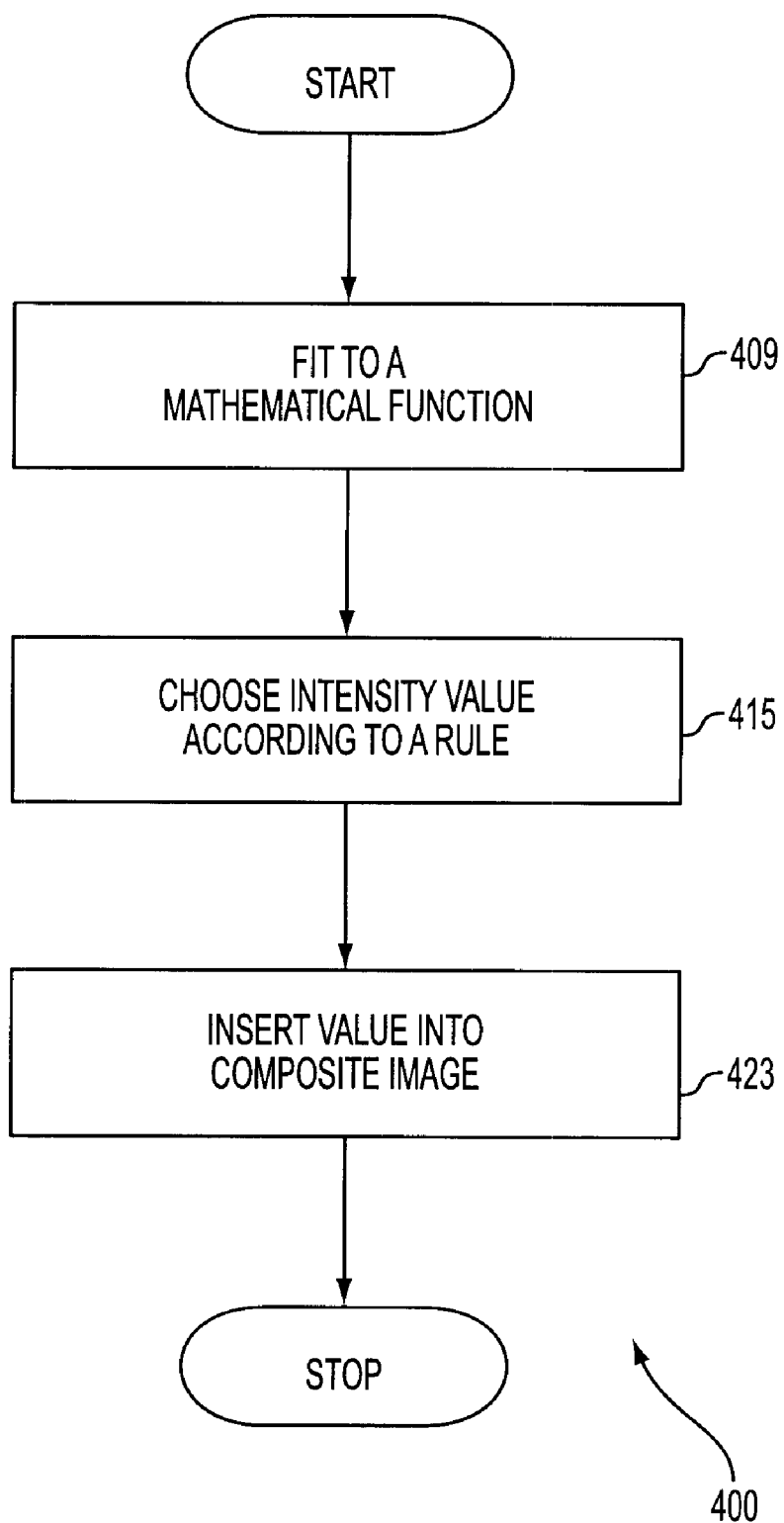
FIG. 4 shows a flowchart of the method of the present invention.

FIG. 4 shows a flowchart 400 of the method of the present invention for processing a single pixel. Prior to processing, the pixel values from the same position in each of the input images may be assembled for analysis (assuming that all images are in good registration and that any necessary image warping has been done). Such assembly may be done to order the image intensity values of each pixel for processing. Intensity values are used to create a mathematical function for choosing an optimum intensity value to be used in the composite image. In step 409, the intensity values for a subject pixel are fitted to a mathematical function. There are numerous methods applicable for fitting data of this type. The present implementation utilizes a least-squares fit to a polynomial. The curves represented by two such polynomial functions representing two subject pixels are given in FIGS. 1E and 2E as examples. Typically, the intensity values may be fitted to a third or fourth order polynomial function. The resultant polynomial function predicts pixel intensity with respect to time, exposure, or sample concentration. Commonly used function-fitting procedures may be found in Data Reduction for the Physical Sciences, by Philip R. Bevington, published by McGraw-Hill Book Company, 1969 (see pages 134–163).

In step 415, for a subject pixel, an intensity value is computed according to a predetermined rule. In essence, the computation of an intensity value is a determination of optimal spot development. In the preferred embodiment, an intensity value may be chosen as the maximum slope exhibited by the mathematical function during the time interval for which measurements were collected. Therefore, the mathematical function smoothes out the time response of the particular pixel. In an alternate embodiment, a maximum difference of pixel intensity values may be chosen without fitting the data.

In step 423, the chosen pixel is inserted into the composite image.

It should be understood that the method as described above may be applied to every pixel in the composite image. In this manner, the plurality of gel electrophoresis images may be processed to find an optimal pixel intensity value for every pixel of the composite image. The composite image may be a base image selected from a first, last, or any image in the plurality of images, wherein the intensity value of each existing pixel in the base image may be replaced by a chosen pixel intensity value from among the images. Alternately, the composite image may be newly created during the process of the present invention.

It should be understood that the above steps may be performed for all pixels, for one designated spot, multiple spots, or all spots in the plurality of images. The resulting composite image will have increased dynamic range, as no pixels will be saturated. Both faint and intense spots are analyzable from the same image. The readability and accuracy of the gel electrophoresis image analysis is therefore improved.

Figure 5:
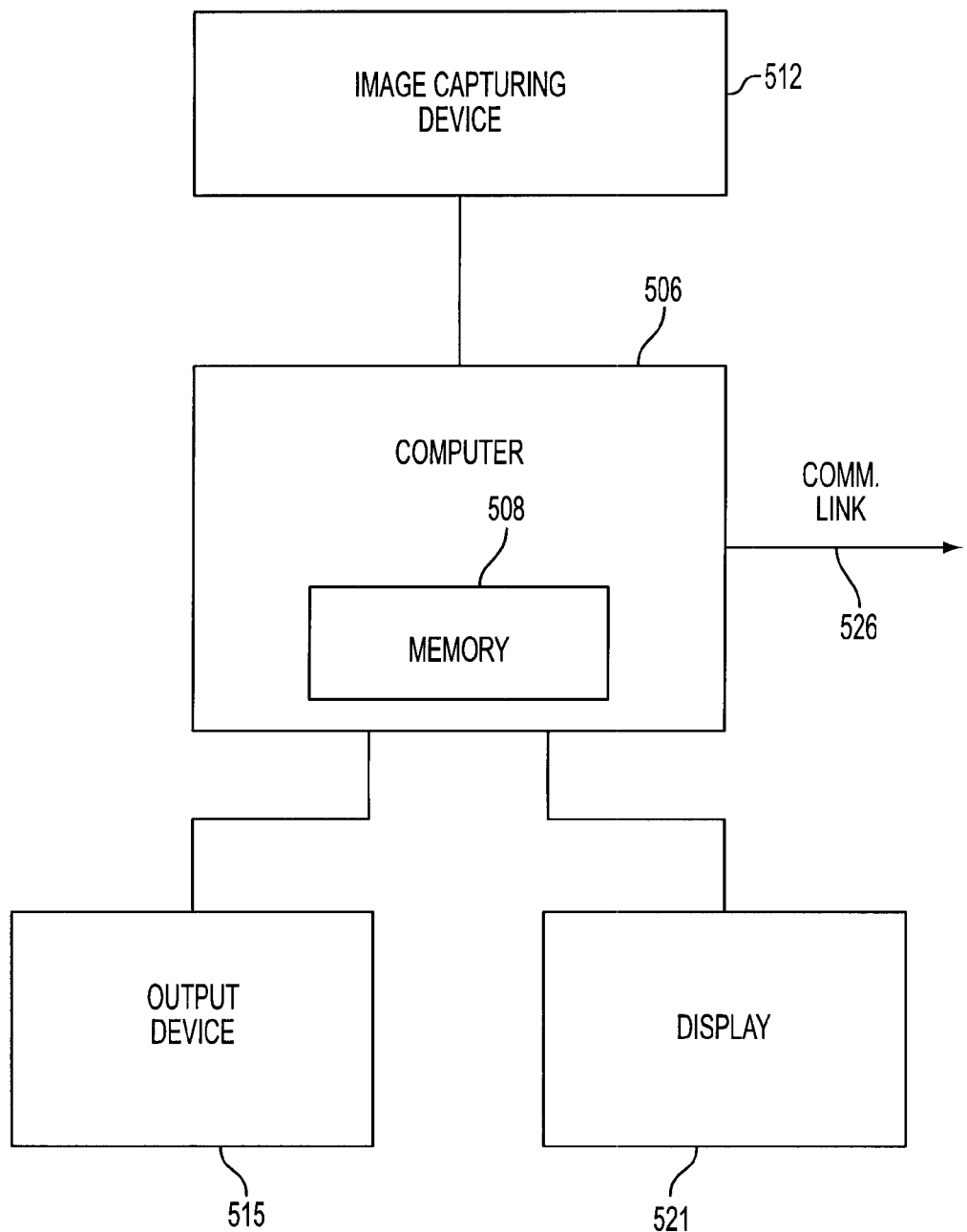
FIG. 5 shows a block diagram of an apparatus of the present invention.

FIG. 5 shows an apparatus 500 for forming the composite image of the present invention. The apparatus 500 includes a computer 506 having a memory 508, an image capturing device 512 connected to the computer 506, an optional output device 515 connected to the computer 506, an optional display 521 connected to the computer 506, and an optional communications link 526 connected to the computer 506.

The computer 506 may be any type of general purpose computer. The computer 506 receives gel electrophoresis images from the image capturing device 512. In the preferred embodiment the image capturing device 512 is directly connected to the computer 506, but alternatively may communicate with the computer 506 via a modem and telephone line, a computer network such as the Internet, etc. The image capturing device in the preferred embodiment is a digital camera, but alternatively may be a scanner, video camera, or any other digital imaging device.

When a gel electrophoresis image is received by the computer 506, the image may be stored in the memory 508. The memory 508 may be one or more types of memory, such as random access memory (RAM), read-only memory (ROM), magnetic disk, tape or card, or optical memory. Multiple images may be stored, processed, and combined. The resultant composite image may also be stored in the memory 508.

The optional output device 515, optional display 521, and optional communications link 526 may be used before, during, or after the processing of the composite image. The optional output device 515 may include a printer. The optional display 521 may include a computer monitor or cathode ray tube. The optional communications link 526 may include a telephone link (and associated modem, not shown) or a computer network link (and associated network interface card, not shown).

In operation, the image capturing device 512 captures a plurality of images of an electrophoresis gel. The computer 506 receives the plurality of gel images, combines them into one composite gel image having an improved dynamic range, and may then output the resultant image in some manner, such as through a printout or visual display. The resultant composite image may be stored and may be used to analyze a macromolecular composition of a sample under test.

It is contemplated that the present invention may be applicable to any macromolecular analysis using stains that progressively bind to or develop around macromolecular components. For example, image analysis is appropriate to both visible stains, producing increased or decreased optical density relative to the background, and to fluorescent stains that are only visible when illuminated. Other analysis applications where the present invention may be employed are in X-ray diffraction, gradient analysis, cell cultures, and bacterial growth. In X-ray diffraction a sample is bombarded with X-rays and a diffraction pattern produced by the sample is analyzed. In gradient analysis a sample is separated across a gradient according to various chosen factors such as molecular weight, pH factor, etc. The present invention may be used in cell cultures to detect or highlight cell changes over time, such as drug absorption or effectiveness, for example. In addition, the present invention may be used to detect bacterial growth or reduction in order to determine, for example, susceptibility to antibiotics.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computer-implemented image processing method for increasing a dynamic range of a gel electrophoresis image by combining a plurality of gel electrophoresis images into one composite gel electrophoresis image, said method comprising the steps of:

staining an electrophoresis gel scanning the electrophoresis gel repeatedly at different times during said staining step thereby creating a plurality of gel images corresponding to a single gel, the plurality of gel images showing the gel at different stages during the staining process;

fitting gel electrophoresis pixel intensity values from the plurality of gel images corresponding to a protein spot to a mathematical function;

computing from said mathematical function pixel intensity values according to a predetermined rule for the protein spot; and inserting the computed pixel intensity value into the composite image.

2. The image-improvement method of claim 1, wherein said fitting, computing, and inserting steps are performed for each pixel of a plurality of protein spots present in the gel images for insertion into said composite gel electrophoresis image.

3. The image-improvement method of claim 1, wherein said plurality of gel images are obtained at irregular time intervals.

4. The image-improvement method of claim 1, wherein said plurality of gel images were taken at different exposure levels.

5. The image-improvement method of claim 1, wherein said plurality of gel images were taken at different sample concentrations.

6. The image-improvement method of claim 1, wherein said electrophoresis gel is a two-dimensional electrophoresis gel.

7. The image-improvement method of claim 1, wherein said predetermined rule of said computing step includes computing an intensity value based on the maximum slope.

8. The image-improvement method of claim 1, wherein said predetermined rule of said computing step includes computing a value of said mathematical function at a reference time.

9. The image-improvement method of claim 1, wherein said predetermined rule of said computing step includes computing a maximum slope from the pixel intensity values without fitting to a mathematical function.

10. The image-improvement method of claim 1, wherein pixels in said plurality of gel images are stored as an array of pixel intensity values.

11. The image-improvement method of claim 1, wherein said plurality of gel images are taken of gels subjected to a protein separation procedure.

12. The image-improvement method of claim 1, wherein said plurality of gel images are from a nucleic acid separation procedure.

* * * * *

UNITED STATES PATENT AND TRADEMARK OFFICE
CERTIFICATE OF CORRECTION

PATENT NO. : 6,535,624 B1
DATED : March 18, 2003
INVENTOR(S) : John Taylor, Jr.

It is certified that error appears in the above-identified patent and that said Letters Patent is hereby corrected as shown below:

<u>Column 4,</u>
Line 28, before "concentration" delete "no".

<u>Column 5,</u>
Line 9, before "intensity" delete "no".
Line 12, before "intensity" delete "a".

Signed and Sealed this

Second Day of September, 2003

JAMES E. ROGAN
*Director of the United States Patent and Trademark Office*